Feb. 1, 1938.   H. A. BERKMAN   2,106,711
FOOD CUTTER
Filed July 26, 1935   3 Sheets-Sheet 1
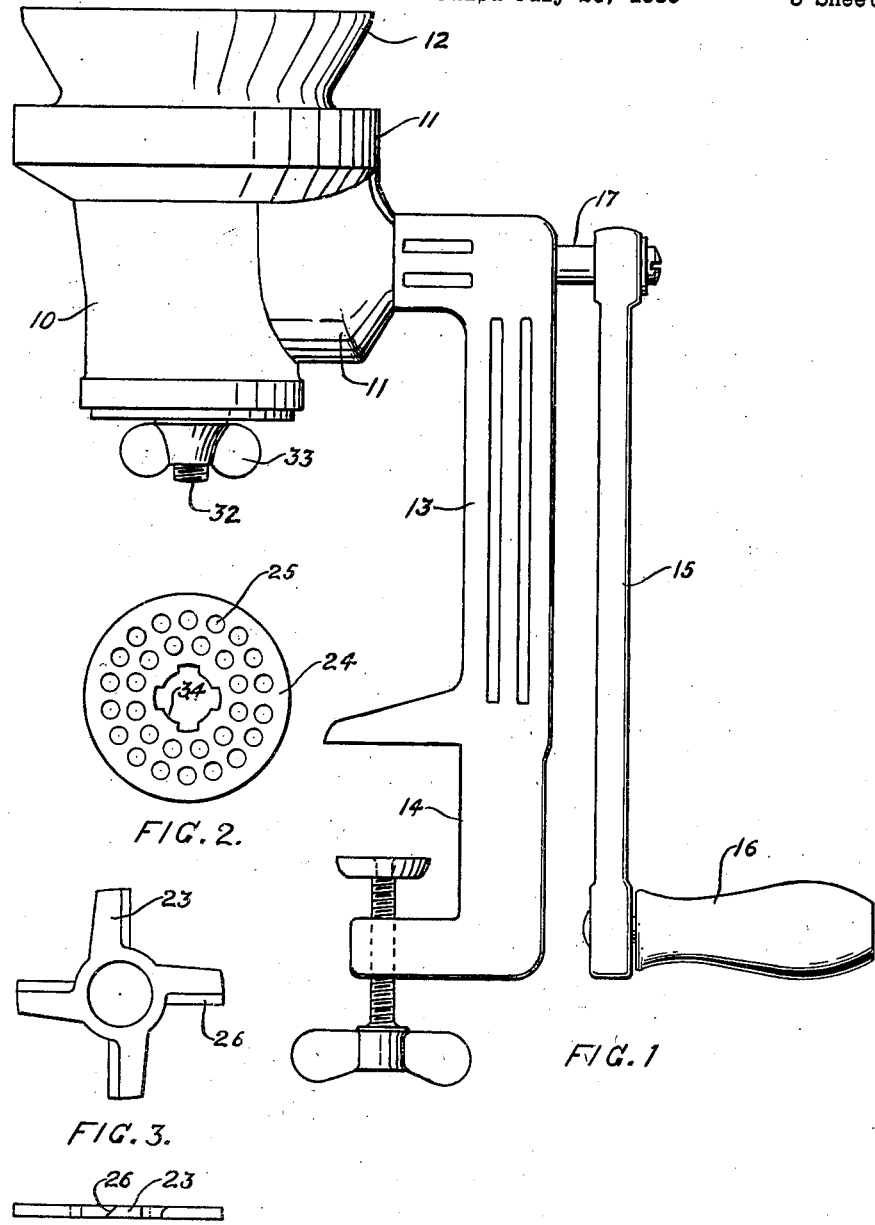
INVENTOR
HERBERT A. BERKMAN
BY E. Andrews
ATTY.

Feb. 1, 1938. H. A. BERKMAN 2,106,711
FOOD CUTTER
Filed July 26, 1935 3 Sheets-Sheet 2

INVENTOR
HERBERT A BERKMAN
BY E J Andrews
ATTY.

INVENTOR
HERBERT A. BERKMAN
BY E. J. Andrews
ATTY.

Patented Feb. 1, 1938

2,106,711

UNITED STATES PATENT OFFICE 2,106,711

FOOD CUTTER

Herbert A. Berkman, Chicago, Ill.

Application July 26, 1935, Serial No. 33,256

2 Claims. (Cl. 146—192)

This invention relates to food cutters, and it has for its object providing various improvements in food cutters, particularly such cutters for use in cutting or grinding meats or the like.

Figure 5:
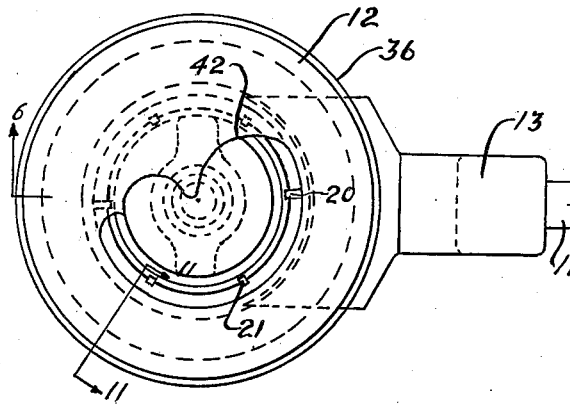
Figure 8:
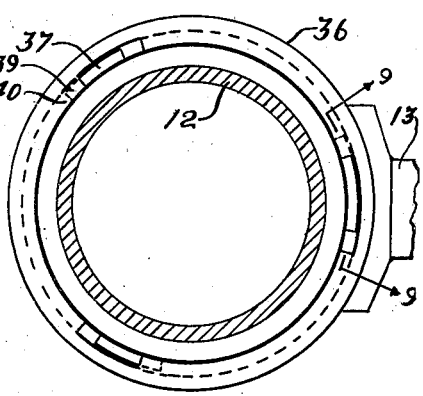
Figure 6:
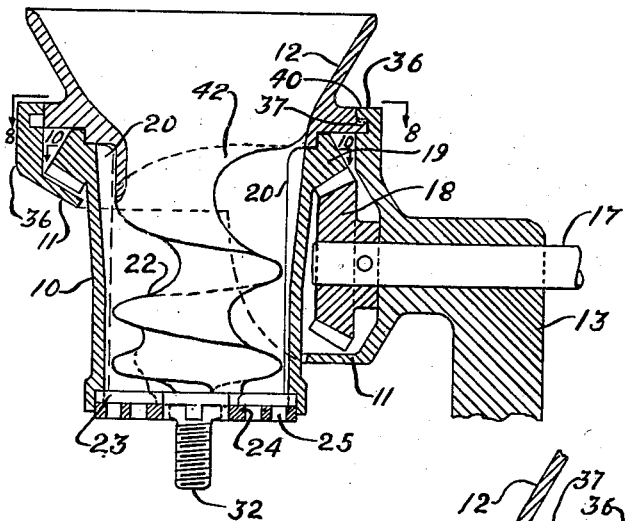
Figure 9:
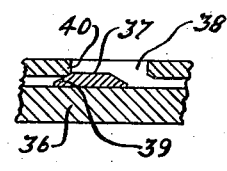
Figure 10:
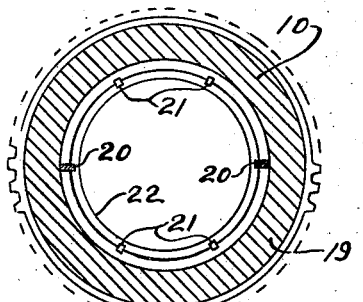
Figures 7, 11:
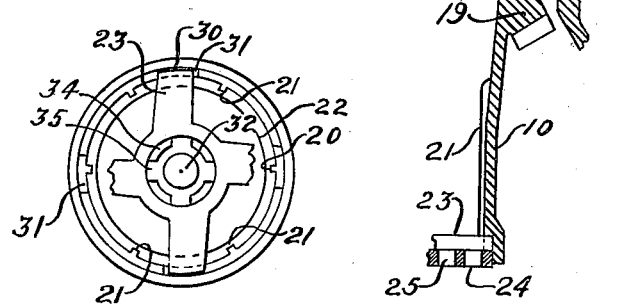
Figure 12:
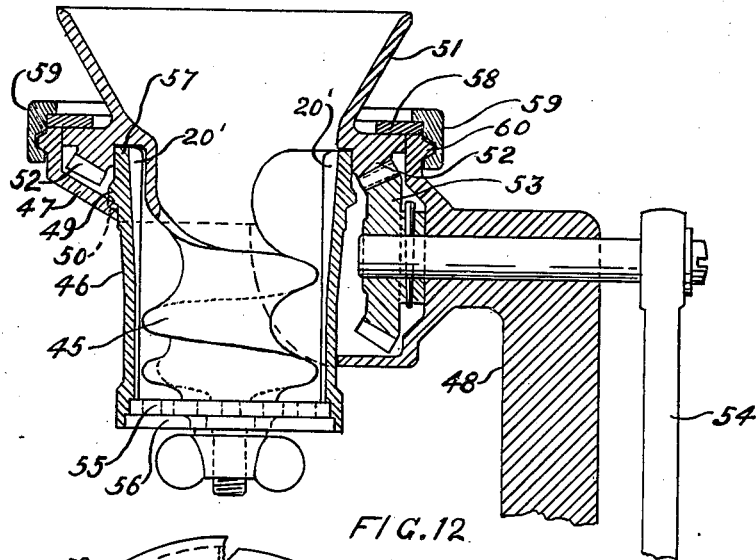
Figure 13:
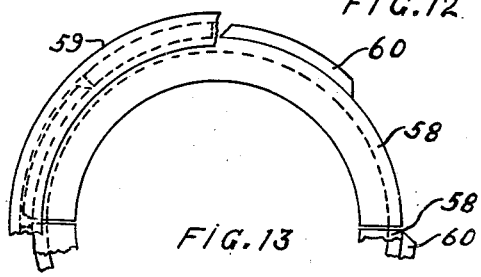
Figure 14:
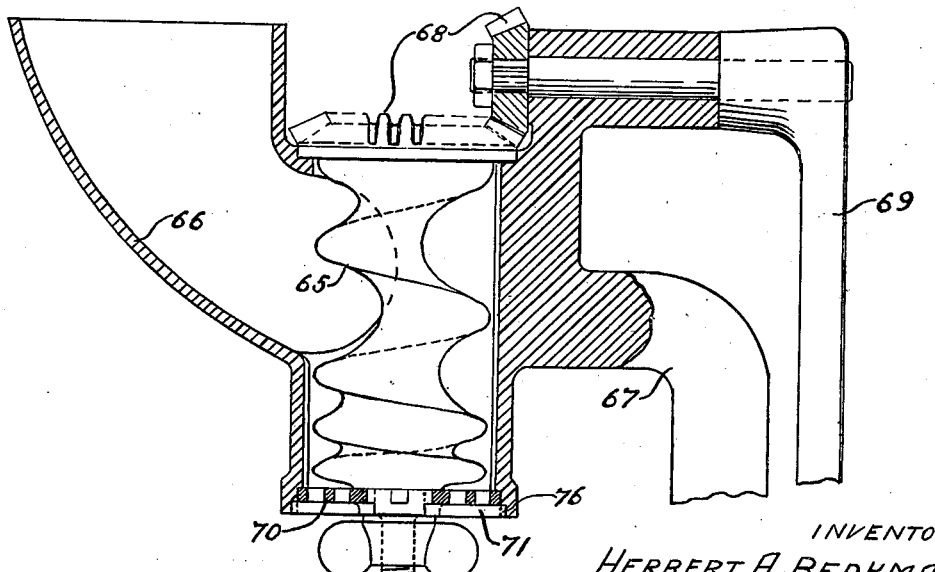

Of the accompanying drawings Fig. 1 is an elevation of a food cutter which embodies the features of my invention; Fig. 2 is a plan view of the outlet member of the cutter; Fig. 3 is a plan view of the cutter knife; Fig. 4 is an edge view of the knife; Fig. 5 is a top view of the food cutter; Fig. 6 is a central sectional view thereof along the line 6—6 of Fig. 5; Fig. 7 is a bottom view with the outlet member removed; Fig. 8 is a sectional view along the line 8—8 of Fig. 6; Fig. 9 is a sectional view along the line 9—9 of Fig. 8; Fig. 10 is a sectional view along the line 10—10 of Fig. 6; Fig. 11 is a fractional sectional view along the line 11—11 of Fig. 5; Fig. 12 is a central sectional view of a modified food cutter; Fig. 13 is a fractional plan view of the cutter of Fig. 12; and Fig. 14 is a central sectional view of a further modification.

The preferred form of my food cutter comprises in general a casing 10, gear casings 11, a receiving cup 12, and a support 13. The support is adapted to be clamped to a table by means of a clamp 14; and the cutter is operated by means of a crank 15 having an operating handle 16. The crank is fixed to a shaft 17 which is adapted to operate the meshing gears 18 and 19.

The gear 19 is fixed to the upper end of the casing 10, and in operation this casing is rotated by the gear. In the bore of the casing, and fixed to its sides, are ribs 20 and 21. Inside of these ribs is nonrotatably mounted a worm 22 immediately under the cup 12; and beneath the worm is the cutting knife 23 and the perforated disk 24 which forms the outlet of the device.

In operation the food to be cut is fed into the receiving cup 12 and it is pressed down onto the worm and the ribs 20 and 21. These ribs as they rotate carry the food around the worm and the worm forces the food down against the knife and the disk 24. Preferably the knife is positioned above the disk, and the knife rotates with the casing 10; but the disk is nonrotatably mounted, being fixed to the lower end of the worm 22. The food is forced down by the worm into the openings 25 of the disk, and it is sliced off by the rotating knife with its cutting edges 26 which slide along the surface of the disk.

The receiving cup 12 and the worm are kept from rotation in any suitable manner, being fixed with reference to the gear casings 11 and the support 13. The casing 10 is rotatably mounted in the gear casing 11, and the cutter knife is nonrotatably mounted in the lower end of the casing 10, the projecting ends of the knives, 30, lying in recesses 31 in the lower end of the casing 10. The outlet disk is fixed to the worm by means of a stud 32 and a thumb nut 33 and interlocking flanges 34 and 35.

The receiving cup is nonrotatably mounted in the rim 36 of the casing 11 by means of flanges 37 projecting into recesses 38 in the rim. The cup is removably mounted in the rim and may be lifted out from the rim when the flanges register with the recesses 38. But in operation the cup is rotated slightly until the toe 39 of the flange 37 passes under a flange 40 on the upper edge of the rim 36. Any suitable means may be used to prevent the cup from being inadvertently forced from the rim; but the toes prevent this whenever the casing is being rotated in either direction.

To allow the food to pass more freely down into the casing 10 I prefer to have some of the ribs 21 extend only part way upwards and project only slightly at their upper ends into the casing 10, while the other ribs 20 project upwardly to the top of the casing and project inwardly a material distance, as indicated. Preferably there are but two of these ribs 20, and they are on opposite sides of the casing. This provides more room for the food, and at the same time the projecting ribs 20 as they revolve will draw the food against the worm sufficiently.

To eliminate danger of the fingers being caught in the device as the casing rotates I position the upper end 42 of the worm towards the back side of the cup 12, Fig. 5, as in operation the fingers are usually placed in the cup parallel with the shaft 17. With this arrangement it would be difficult for one of the ribs 20 to drag the fingers clear around into contact with the worm.

My improved food cutter is arranged to receive the food to be cut at its upper end and deliver it at its lower end, so that the food passes downward until delivered. This adds to the convenience of operating and of receiving the food after it is cut. Also, if desired, fruits, such as oranges or lemons may be passed through the device, and the juice will run downwardly into a receiving cup placed beneath the outlet, and, as there are no lateral openings the juice can pass only downwardly into the receiving cup.

The arrangement of my food cutter is such that it may readily be cleaned. The entire cutting mechanism may be removed from the support and gear casings by merely lifting it upwardly when the flanges 37 are turned to register with the recesses 38. This entire mechanism may then be easily rinsed out; and if desired this mechanism may be taken entirely apart by merely removing the thumb nut 33.

In Fig. 12 I have illustrated a modification in which the worm 45 is rotated and the casing 46 is stationary. In this case the supporting frame 47 may be integral with the support 48. The casing 46 rests in the frame 47, and it is kept from rotating by any suitable means, such as by a flange 49 projecting into a recess 50 in the frame. The worm 45 may be integral with the receiving cup 51; and fixed to the cup, preferably integral therewith, is a bevel gear 52. This gear meshes with another gear 53 which is operable by means of the arm 54.

In operation the meat or other food is fed into the cup and pressed downwardly. The ribs 20' which are fixed to the casing 46 prevent rotation of the food, and it is forced downwardly by the worm against the disk 55, which corresponds to the disk 24 of Fig. 6. Adjacent this disk is a knife 56, in this instance shown beneath the disk. The disk is perforated and is preferably fixed to the worm so that it rotates therewith. The knife is preferably nonrotatably mounted with reference to the casing, so that when the device is operated the knife is stationary. But it is to be understood that the disk may be stationary and the knife rotatable, and also the knife may be positioned above the disk.

In order that the worm may be readily removed from the frame for cleaning or otherwise, I prefer to have the cup supported on the upper end 57 of the casing. To prevent upward movement of the cup and worm when in action I provide a split ring 58 which rests on the upper edge of the gear 52, and the split ring is held in place by an annular clamping member 59 which may be screwed onto the frame member 47 by means of fractional threads 60.

Fig. 14 illustrates a further modification in which the worm also is rotatably mounted and the receiving cup is stationary and is preferably integral with the support 67. The worm is rotated by means of the gears 68 and the arm 69. In this case the perforated disk 70 rotates with the worm and the knife 71 is stationary, being held so by the ends 76.

It will be seen that in each of these cases the chopped food passes out at the lower end of the casing and enters at the upper end; and also that there are no openings for the food or juice to escape from the casing except through the perforated disk and the knife in the opening at the lower end of the casing.

I claim as my invention:

1. A food cutter comprising a frame, a food receiving cup resting on the frame, a worm attached to the lower end of the cup, food cutting and discharging means attached to the lower end of the worm, a casing enclosing the worm and resting on the said means, whereby said elements may all be elevated and removed from the frame, and means for rotating relatively the casing and the worm.

2. A food cutter as claimed in claim 1, the said casing having its ends journaled with reference to the upper and the lower ends of the worm.

HERBERT A. BERKMAN.